United States Patent [11] 3,542,202

| [72] | Inventor | Harry Ball<br>New Brunswick, New Jersey |
|---|---|---|
| [21] | Appl. No. | 815,388 |
| [22] | Filed | April 11, 1969 |
| [45] | Patented | Nov. 24, 1970 |
| [73] | Assignee | Technical Fabricators, Inc.<br>Nutley, New Jersey<br>a corporation of New Jersey |

[54] FILTER UNIT
8 Claims, 3 Drawing Figs.

| [52] | U.S. Cl. | 210/232 |
|---|---|---|
| [51] | Int. Cl. | B01d 29/14 |
| [50] | Field of Search | 210/232, 443, 444, 440, 445, 541, 331 |

[56] References Cited
UNITED STATES PATENTS

| 1,203,835 | 11/1916 | Zahm | 210/443X |
| 3,358,839 | 12/1967 | Simons | 210/232 |
| 2,605,903 | 8/1952 | Schuller | 210/331 |

Primary Examiner—Reuben Friedman
Assistant Examiner—T. A. Granger
Attorney—Burgess, Ryan and Hicks ABSTRACT: The filter unit comprises a housing and a filter cartridge inside the housing. The filter cartridge is mounted inside the housing and can be locked therein by a connection operable automatically into locking position when the cartridge is turned relative to the housing in one direction and releasable automatically when the cartridge is turned in the opposite direction to permit removal of said filter cartridge from said housing.

Patented Nov. 24, 1970

3,542,202

INVENTOR
HARRY BALL

BY
Burgess, Ryan & Hicks
ATTORNEYS

FILTER UNIT

The present invention relates to a new and improved filter unit.

One object of the present invention is to provide a new and improved filter unit, which comprises a filter cartridge and a housing therefor, and which is constructed to permit the filter cartridge to be easily mounted firmly inside said housing or demounted by simple manipulations.

In accordance with certain features of the present invention, the cartridge housing has an inlet and an outlet, and a partition wall which divides the inside of the housing into two compartments communicating directly with said inlet and said outlet respectively and which has a hole large enough to permit the filter cartridge to be lowered in said housing through said hole. The filter cartridge comprises a rigid perforated filter sleeve support of tubular shape, and a replaceable porous flexible filter sleeve, slipped over one end of this support and extending therealong to a region near the other end. The latter end of the tubular sleeve support is enlarged to seat on said partition wall when said filter cartridge is passed through said hole, as described.

Means are provided for automatically locking the filter cartridge in seated position described, when said filter cartridge is turned in the partition wall hole in one direction and for automatically releasing the filter cartridge for removal from said hole when the filter cartridge is turned in the opposite direction. More specifically, the locking means described takes the form of a slidable wedging connection between the filter cartridge and the partition wall, which interlocks the cartridge and the wall by wedging action, when said cartridge is turned in one direction and which is released when the filter cartridge is turned in the opposite direction. The turning of the filter cartridge in locking direction presses the enlarged end of the rigid filter sleeve support towards its seat on the partition wall, and the porous flexible filter sleeve at this end intervening between the seat and the enlarged end of the filter sleeve support is made to serve as a sealing gasket as a result of this pressing action.

Various other objects, features and advantages of the invention are apparent from the following description and from the accompanying drawings, in which FIG. 1 is an axial cross section of a filter unit embodying the present invention and shows the filter cartridge and the housing partition wall in interlocked position;

Figure 1:
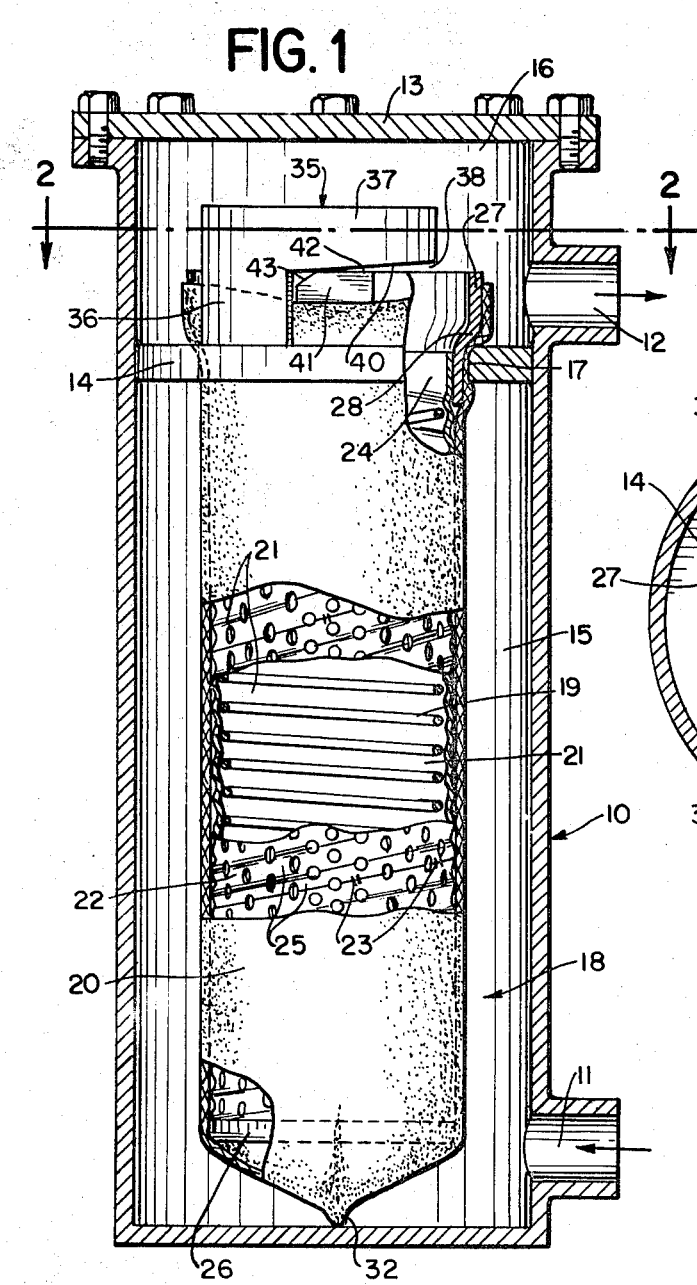

Referring to the drawings, the filter unit of the present invention comprises a cylindrical housing 10, having an inlet 11 and outlet 12 near opposite ends of said housing and closed at one end near its outlet by a removable cover 13. Inside the housing 10 between the inlet 11 and outlet 12 is a partition wall 14, rigidly secured to said housing, as for example, by welding, to divide said housing into two compartments 15 and 16 communicating directly with said inlet and said outlet respectively. This partition wall 14 has a center circular hole 17 concentric with the cylindrical walls of the housing 10.

Removably supported inside the housing 10 is a filter cartridge 18 comprising a flexible porous sleeve 20, a rigid tubular perforated support 21 for said sleeve and a coil spring 19 inside the support to brace the walls of said support against the external pressure of the liquid or other fluid to be filtered on said walls. The filter sleeve support 21 comprises a perforated, corrugated metal strip 22, spirally wound with successive convolutions overlapping and secured together, as for example, by spot welding in the regions 23 of the overlaps, to form a tube 24 with a series of continuous helical channels 25 formed by the corrugations. The lower end of the tube 24 is closed by a metal cap 26, secured to said tube, as for example, by riveting, and the upper end of the tube is open and has rigidly secured thereto, as for example by riveting, a heavy circular metal collar 27, flaring outwardly in the region 28.

The filter sleeve 20 is in the form of a sock closed at one end, and is a porous needled felt, made of fibers, multidirectionally arranged randomly in the form of a rectangular sheet, free from binders, the needling serving to interlock the fibers. The fibers may be of thermoplastic material, such as polypropylene, or polyesters, such as Dacron (polyethylene terephthalate) and the filter sleeve 20 is formed by bringing the opposite edges of the rectangular fiber sheet in overlapping relationship in the region 31, and heat-sealing these overlapping edges together to form a tube. The opposite sides at one end of the tube so formed are brought together and heat-sealed in the region 32 to close the tube at this end and shape it in the form of a sock.

The fibers from which the filter sleeve 20 is formed may not be of thermoplastic material, in which case it cannot be heat-sealed. For example, the fiber may be of viscose rayon and the fiber sheet may be formed into a sock by the use of binding strips of acrylic material in the seamed regions 31 and 32.

Before assembling the filter unit, the filter sleeve 20 is slipped over the smaller end of the tubular support 21. The sleeve 20 is dimensioned to embrace snugly the support 21 and to extend longitudinally almost to the other larger end of the support. The overall outer diameter of the filter cartridge 18 so formed, is such, as to permit the cartridge to be lowered in the housing 10 through the position wall hole 17 with a snug slide fit, and when so lowered, the flared region 28 of the support 21 seats on the circular edge of the hole, with the upper open end section of the filter sleeve 20 intervening between said flared region and said seating edge to serve as a sealing gasket.

Means are provided for locking the filter cartridge 18 to the housing partition wall 14 by a simple turning manipulation of the filter cartridge. This locking means comprises a pair of angle-shaped arcuate metal clips 35 rigidly secured to the partition wall 14 on diametrically opposite sides of the hole 17, as for example, by welding. Each of these clips has a leg 36, upstanding from the partition wall 14 and a leg 37 extending arcuately along said wall concentric with the wall opening 17 to form with said wall a recess 38. The edge 40 of the arcuate leg 37 facing the partition wall 14 slants in a direction to taper the recess 38 towards the upstanding leg 36, so that said recess serves as a wedging recess.

The locking means also comprises a pair of metal lugs 41, in the form of ears, extending radially from diametrically opposite sides of the collar 27 and having their upper outer surfaces 42 flat and flush with the upper outer surface of the collar. One radial side of each lug 41 has a bevel 43, to permit entry of the lug into the corresponding wedging recess 38, and the collar 27 is designed to elevate the lugs 41 in relation to housing partition wall 14, so that the outer surfaces 42 of these lugs are above the intermediate regions of the slanting edges 40 of the clips 35, when the collar is seated loosely on said wall.

To facilitate turning manipulation of the filter cartridge 18 in the partition wall hole 17, the upper section of the collar 27 has a diametrically extending handlebar 44 thereacross, integral or otherwise rigid with said collar.

Figure 2:
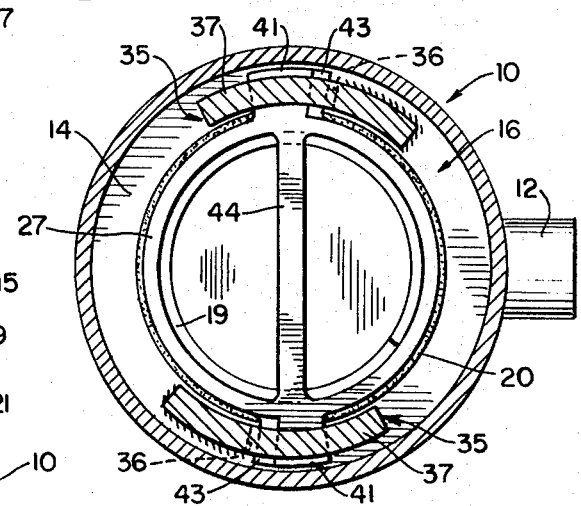
FIG. 2 is a section of the filter unit taken on lines 2—2 of FIG. 1.
Figure 3:
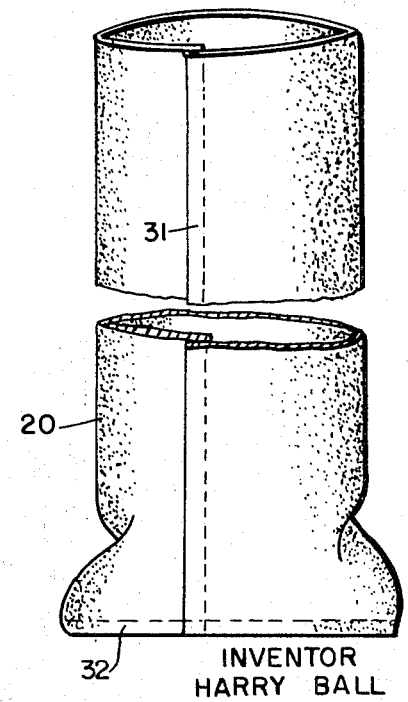
FIG. 3 is a perspective of the porous flexible filter sleeve.

For locking the filter cartridge 18 in position in the housing 10, the cartridge is turned clockwise (FIG. 2) causing the lugs 41 of said cartridge to move into the wedging recesses 38 respectively and the outer surfaces 42 of said ears to ride along the slanting edges 40 of the locking clips 35 in said recess. This action cams the filter cartridge 18 downwardly, causing the flaring region 28 of the collar 27 on said cartridge to press downwardly, causing the flaring region 28 of the collar 27 on said cartridge to press downwardly against the partition wall 14, thereby clamping the upper section of the filter sleeve 20 in position to serve as a sealing gasket. The continued rotation of the filter cartridge 18 clockwise, will tightly wedge the lugs 41 in the wedging recesses 38 and frictionally lock the cartridge in position against turning.

Rotation of the filter cartridge 18 counterclockwise releases the filter cartridge 18 for removal from the housing 10. When the filter cartridge 18 is so removed, the filter sleeve 20 can be slipped off the support 21 and washed for reuse.

Direction of flow through the filter unit is normally from the outside through the filter sleeve 20 toward the inside. The flow can also be in the reverse direction, so that the dirt or solids to be filtered are collected on the inside of the sleeve 20.

I claim:

1. A filter unit comprising a housing having an inlet and an outlet and divided into an inlet chamber and an outlet chamber by a partition wall in said housing between said inlet and said outlet, said wall having a hole and a seat around the periphery of said hole, a filter cartridge comprising a rigid perforated tube having a rigid head at one end defining an outer peripheral shoulder extending around said tube, and a flexible porous filtering sleeve embracing said tube including said shoulder, said tube extending along substantially the full length of said sleeve to serve as a support for said sleeve, said cartridge being dimensioned to permit said cartridge to be inserted into said housing and through said hole with its shoulder bearing against said seat, and a device operable automatically when the seated cartridge is rotated in one direction relative to said wall, for drawing said shoulder against said seat, to clamp the shoulder embracing part of said sleeve between said shoulder and said seat, so that said sleeve part serves as a sealing gasket, and to releaseably lock the cartridge to the wall.

2. A filter unit as described in claim 1, said tube being open at the head end and said sleeve being in the form of a sock closed at one end and open at the other end where it embraces said head.

3. A filter unit as described in claim 1, said head being in the form of a collar, forming an enlargement of the main body of the tube and flaring outwardly towards the adjacent end of the tube, the flaring part of said collar being covered by said filtering sleeve and bearing on said seat in locked position of the cartridge.

4. A filter unit as described in claim 1, said drawing device comprising recessed wedging clip means and recess insertable locking lug means, one of said means being connected to said wall and the other means being connected to said tube, said means having interengageable wedging surfaces, which are relatively slidable when said cartridge is rotated in said hole and while said locking lug means are recess inserted, and which are oriented to cam said head against said seat when said cartridge is rotated in said hole in said direction.

5. A filter unit as described in claim 1, said drawing device comprising two clips secured to said wall on opposite sides of said hole, and each defining a wedging recess with said wall, and two lugs secured to opposite sides of said tube near its head end designed to be wedged in said recesses respectively, when said cartridge is rotated in said direction in said hole, to cam said head against said seat.

6. A filter as described in claim 1, said hole being circular and said cartridge being circular in cross section, said locking device comprising two clips secured to said wall on opposite sides of said hole and extending substantially arcuately along the periphery of said hole substantially concentrically with said hole and in the same circular direction from their points of connection to said wall, each of said clips defining a wedging recess with said wall, and two lugs secured to and extending radially outwardly from opposite sides of said head in the form of ears, said lugs being designed to be wedged in said recesses respectively, when said cartridge is turned in one direction in said hole, to cam said head against said seat.

7. A filter unit comprising a housing having an inlet and an outlet and divided into an inlet chamber and an outlet chamber by a partition wall in said housing between said inlet and said outlet, said wall having a hole defining a seat around its periphery, a filter cartridge with a rigid perforated tubular element having an enlarged head at one end, said filter cartridge being dimensioned and shaped to permit it to be inserted into said housing and through said hole, with its enlarged head resting on said seat when said cartridge has been so inserted, said filter cartridge also including a flexible porous filtering sleeve around said tubular element having an annular portion near one end covering an annular portion of said head and a device for releasably locking said cartridge to said wall when said cartridge is inserted in said hole, comprising recessed wedging clip means and recess insertable locking lug means, one of said means being connected to said wall and the other means being connected to said tubular cartridge part near said head, said means having interengageable wedging surfaces, which are relatively slidable when said cartridge is turned in said hole and while said locking lug means are recess-inserted and which are oriented to cam said head against said seat with said annular sleeve portion clamped between said head and said seat when said cartridge is turned in said hole in one direction.

8. A filter is described in claim 7, said hole being circular and said cartridge being circular in cross section, said clip means comprising two clips secured to said wall on opposite sides of said hole and extending substantially arcuately along the periphery of said hole substantially concentrically with said hole and in the same circular direction from their points of connection to said wall, each of said clips defining a wedging recess with said wall, said lug means comprising two lugs secured to and extending radially outwardly from opposite sides of said head in the form of ears, said lugs being designed to be wedged in said recesses respectively, when said cartridge is turned in one direction in said hole, to cam said head against said seat.